Figure 1:
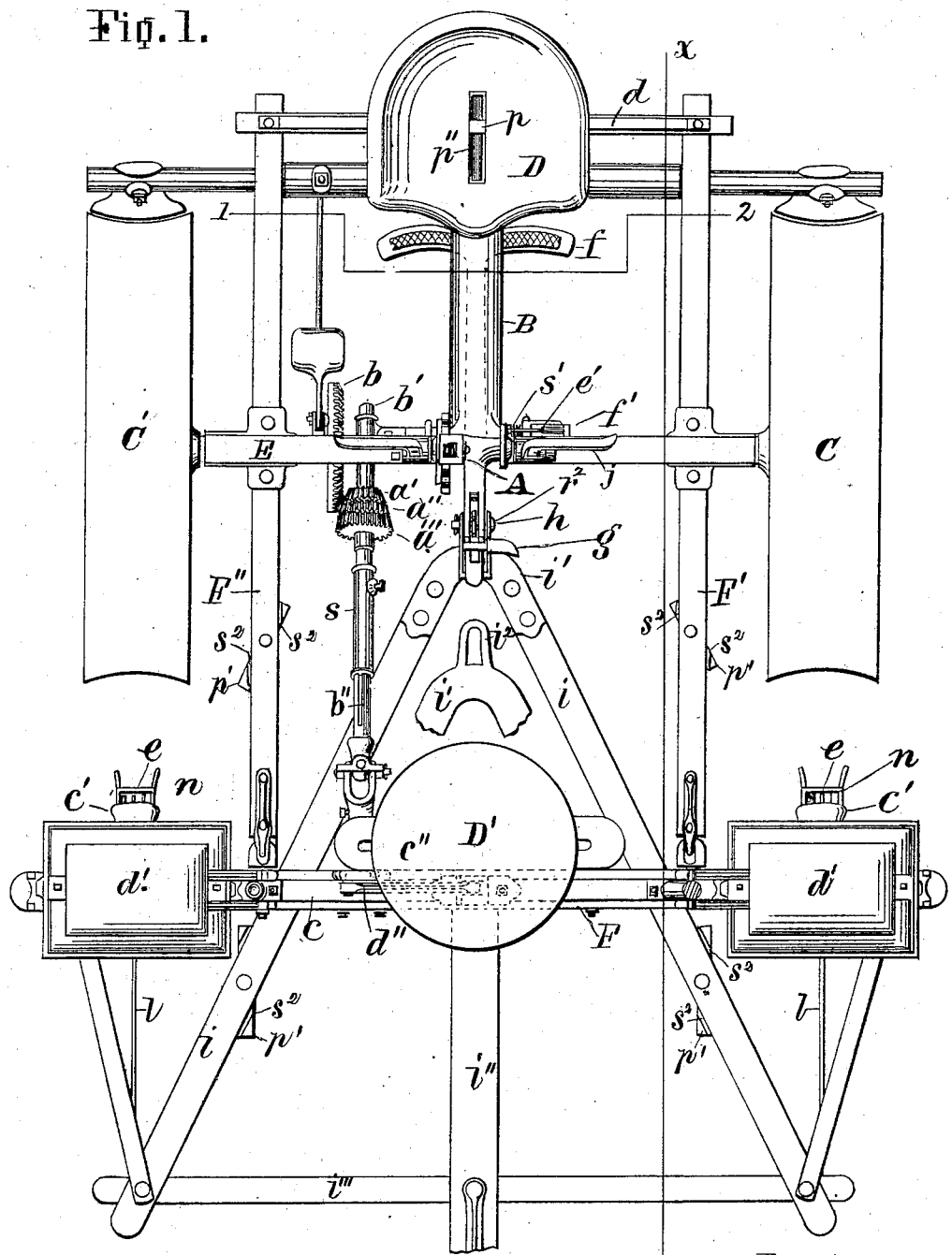

(No Model.) 7 Sheets—Sheet 4.
A. C. EVANS.
CORN PLANTER.
No. 281,756. Patented July 24, 1883.
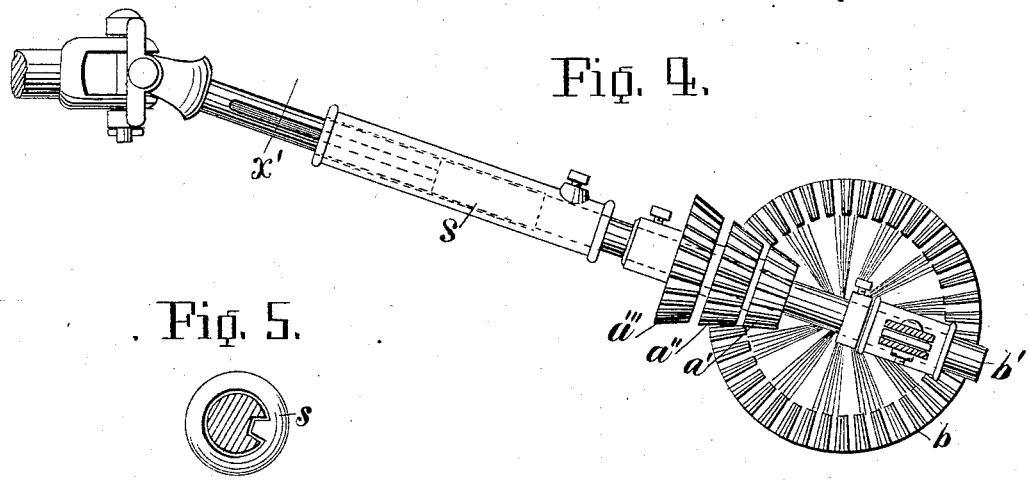
Fig. 4.
Fig. 5.
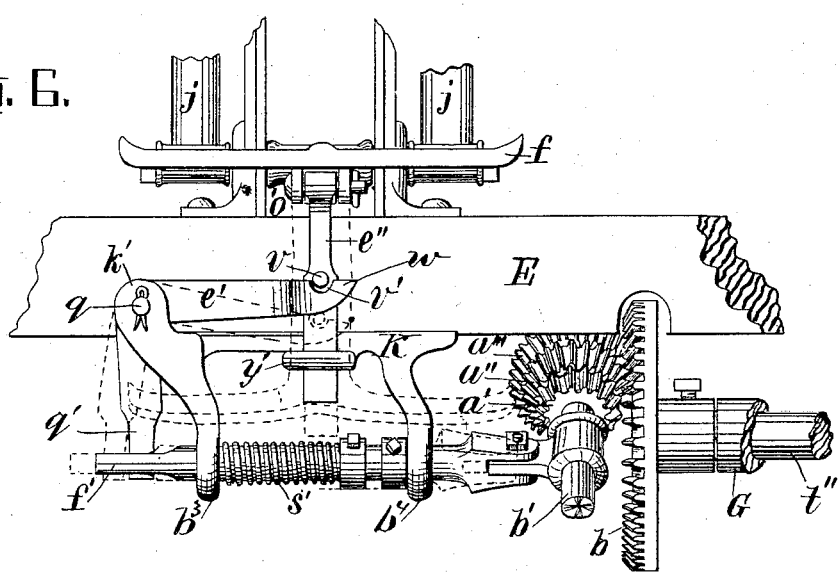
Fig. 6.
Attest
M. M. Converse
G. M. Gridley
Inventor
Austin C. Evans
By B. C. Converse, Atty.

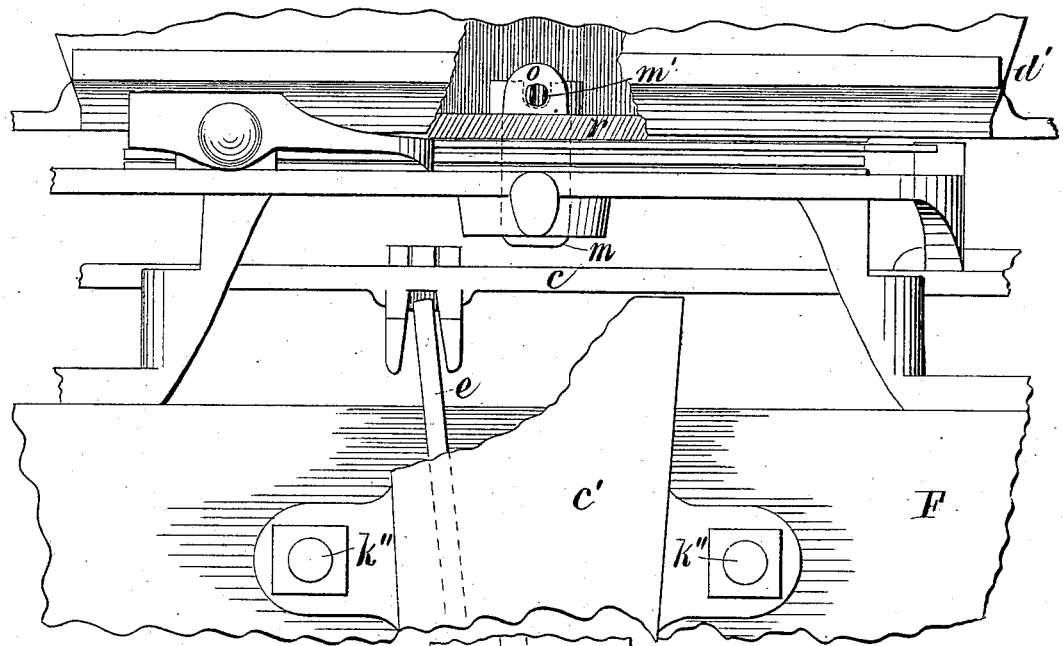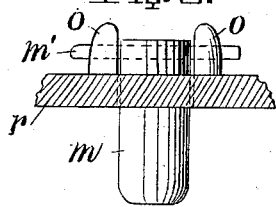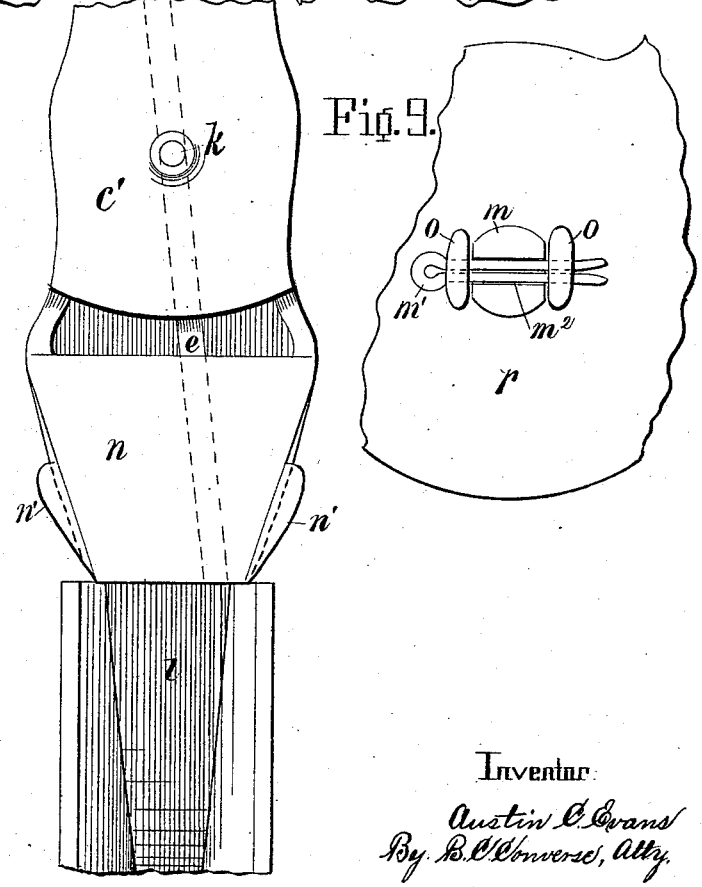

(No Model.) 7 Sheets—Sheet 6.
A. C. EVANS.
CORN PLANTER.
No. 281,756. Patented July 24, 1883.
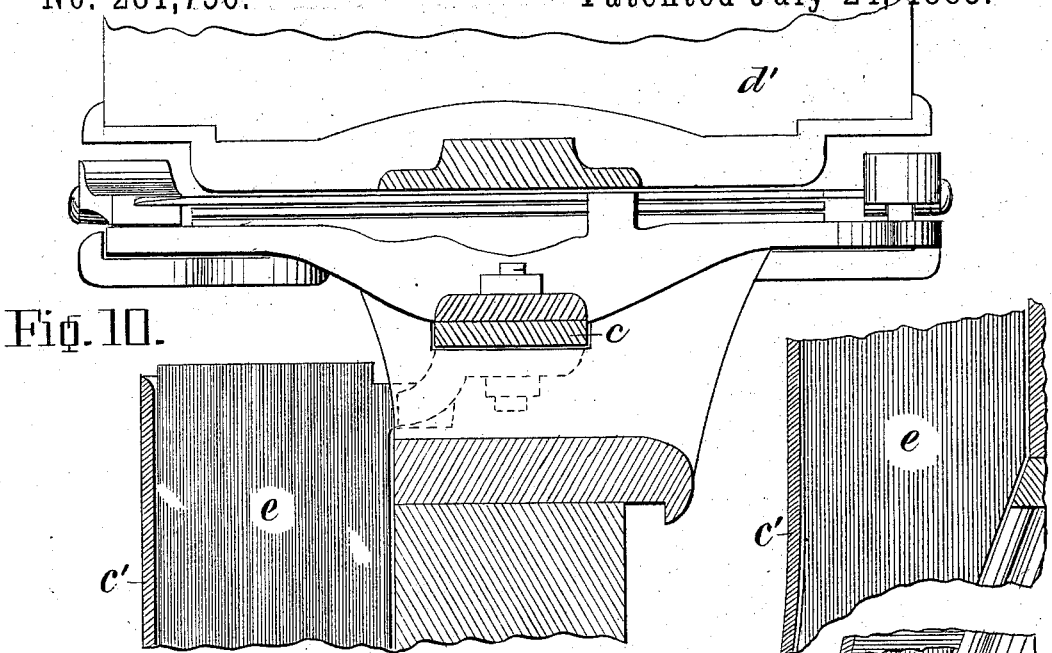
Fig. 10.
Fig. 11. Fig. 12. Fig. 13.
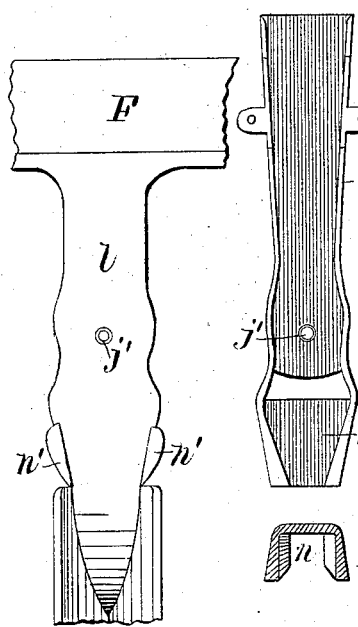
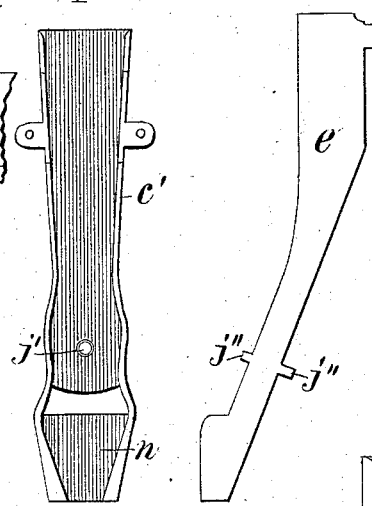
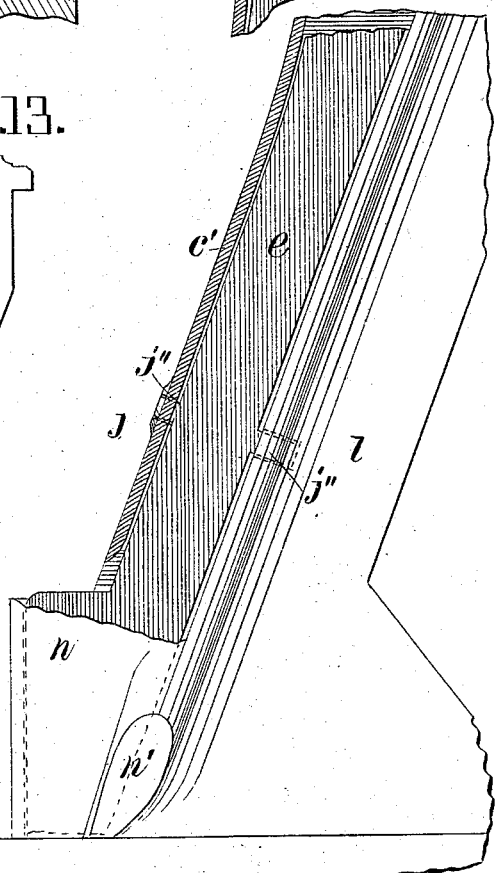
Attest  Inventor
Jn. M. Converse  Austin C. Evans
G. M. Gridley  By B. C. Converse,
 Atty.
N. PETERS, Photo-Lithographer, Washington, D. C.

(No Model.)
A. C. EVANS.
CORN PLANTER.
No. 281,756. Patented July 24, 1883.
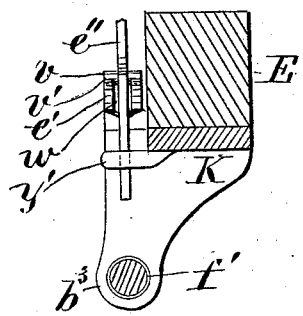
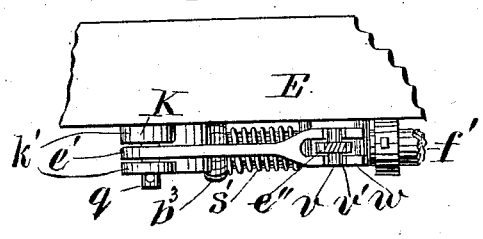

UNITED STATES PATENT OFFICE.

AUSTIN C. EVANS, OF SPRINGFIELD, OHIO.

CORN-PLANTER.

SPECIFICATION forming part of Letters Patent No. 281,756, dated July 24, 1883.

Application filed December 12, 1882. (No model.)

*To all whom it may concern:*

Be it known that I, AUSTIN C. EVANS, a citizen of the United States, residing at Springfield, in the county of Clarke and State of Ohio, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in corn-planters.

My invention relates to improvements in corn-planters convertible from a dropper to a drill, or vice versa, and adapted to be operated for either purpose, by hand or automatically, at the will of the operator.

My invention relates, further, to improvements in the seeding devices, whereby they are more readily changed in converting the machine from a dropper to a drill, and in which the valve is wholly and entirely detachable, so as to allow the seed, in drilling, to pass unobstructed from the seed-disks to the furrow through the seed-tube.

My invention relates, further, to improvements in the removable center pin and its fastening, the object being to prevent it from falling out and being separated from the seed-box in shipping.

My invention relates, further, to improvements in that part of the front section which is directly connected with the raising and lowering devices, whereby the use of a coupling-bar or of a rear extension of the tongue for the purpose of forming the connection is dispensed with, and the power exerted is transmitted to the shoes through the ends of the main cross-bar, where the brace-bars cross it.

My invention relates, further, to improvements in the gearing for connecting and disconnecting the main drive-wheel with the seeding devices, and of the several parts used in throwing the mechanism in and out of gear, whereby it is more readily controlled and operated by the foot-lever or the hand-lever when used either separately or together.

Seven sheets of drawings accompany this specification to illustrate this invention: Sheet 1, with Figure 1; Sheet 2, with Fig. 2; Sheet 3, with Fig. 3; Sheet 4, with Figs. 4, 5, and 6; Sheet 5, with Figs. 7, 8, and 9; Sheet 6, with Figs. 10, 11, 12, and 13; and Sheet 7, with Figs. 14 and 15.

Figure 2:
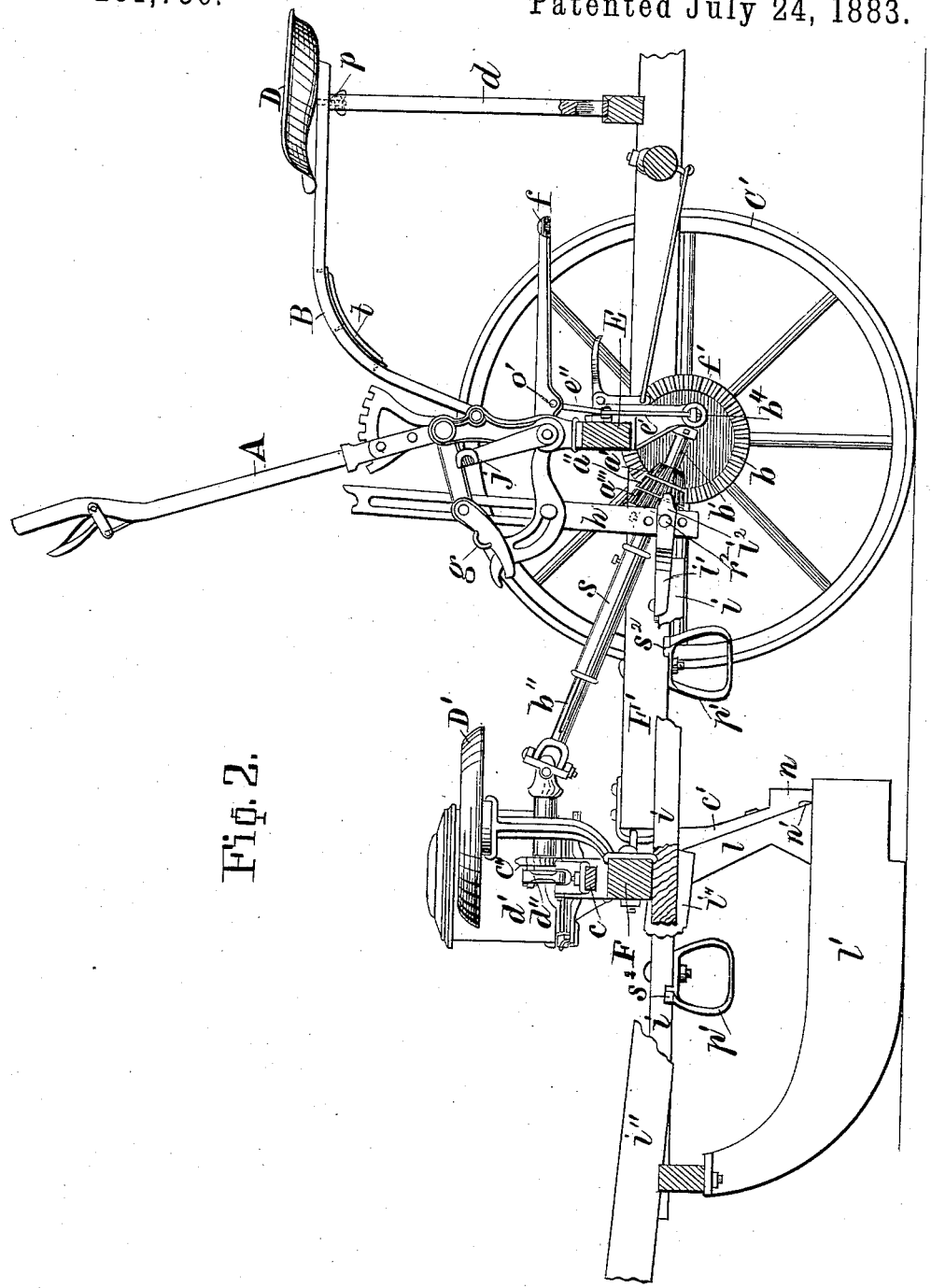
Figure 3:
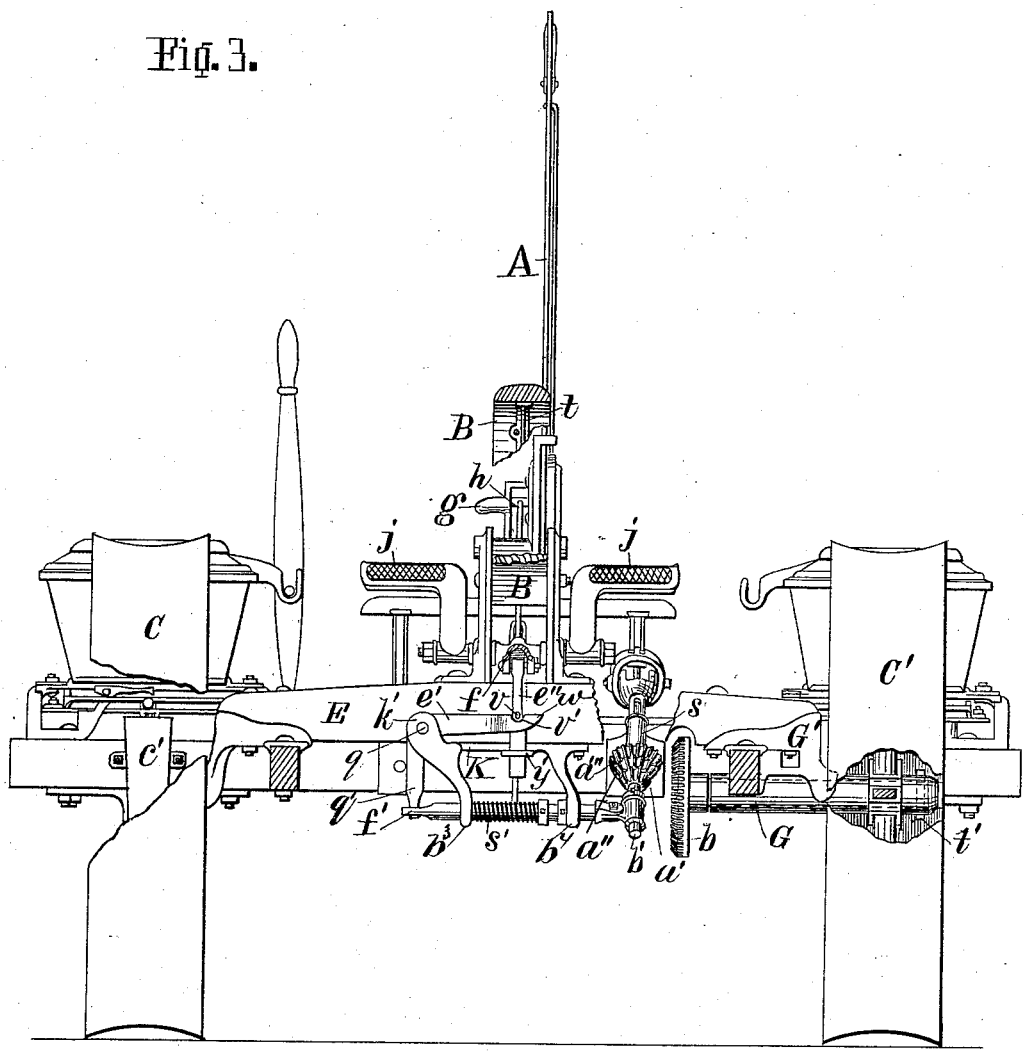

Fig. 1 is a plan view of my improved corn-planter having the improvements applied thereto. Fig. 2 is a vertical section through line $x$, Fig. 1. Fig. 3 is a transverse section through line 1 2, Fig. 1, the view being taken from the rear. The wheels are broken out to show the connection of the drive-gear with the hub in one, and in the other to show the rear of the seed-tube. Fig. 4 is an enlarged view of the driving-gear, with the tumbling-shaft, from the inside. Fig. 5 is a cross-section of tumbling-shaft through line $x'$, Fig. 4. Fig. 6 is a rear elevation of the gearing-axle and the devices for connecting and disconnecting the same. Fig. 7 is an enlarged view of the seed tube and valve in rear elevation, showing also the loose center pin pivoting the seed-disk and its fastening. Fig. 8 is also a view of the pivot-pin of the seed-disk in side elevation. Fig. 9 is a plan view of the same inserted and secured in place. Fig. 10 is a vertical longitudinal section of the seed-tube, showing the valve also in detail. The view is greatly enlarged, and embraces the seed tube and valve broken in three parts. Fig. 11 is a rear view of the runner-post and attached shoe, and shows the hole in which the valve is pivoted. Fig. 12 is an inside view of the seed-tube. Fig. 13 is a side elevation of the seed-valve, which operates within the cavity of the seed-tube. Fig. 14 is an end view of the angular lever which is used to disconnect the gearing, the view being taken from the right. Fig. 15 is a top view of the same.

A is the hand-lever, which operates the devices for depressing the runners into the ground, and elevates the front section, in connection with a vertical slotted bar, $h$, similar to that shown in my Patent No. 265,949, of October 17, 1882; but instead of this vertical bar being attached to the tongue, as shown in that patent, it is attached to and made adjustable in the end of a V-shaped coupling-iron, $i'$, which connects the brace-bars and hounds $i$ at their rear angle, at the center of the machine, just forward of the axle E.

It will be noticed that the bars $i$ extend from the end of the front cross-bar, $i'''$, (just over the point of the shoe,) under the main cross-bar F, back to the point indicated, where they are connected together by the coupling-iron $i'$, before mentioned, thus combining in one both hounds and brace-bars, giving not only greater strength to the front section, but forming exactly the proper central point for coupling and connecting the raising and lowering devices. The iron $i'$ is a V-shaped plate overlapping and connecting the converging end of the two bars $i$, and bolted thereto, so as to make a strong and rigid connection. It is provided with a rear extension, with a slot or loop therein for the insertion of the vertical slotted bar $h$, as seen in Fig. 2. Holes are made in the lower end of the bar to make it adjustable, and it is secured by a pin, $r^2$. By the use of these hounds and the connection thus shown at the center of the machine, the force exerted by the foot and hand levers to press the runners into the ground is equally distributed upon both the shoes through the bars $i$, connecting with the main cross-bar F, near either end of the same. Therefore the furrows made by each shoe will be the same in either hard or soft ground.

In the connection of the raising and lowering devices with the tongue-extension behind the main cross-bar, or with a separate coupling-bar along the central longitudinal line of the machine, it is found in practice that the pressure cannot be evenly exerted upon the shoes, as the front section will oscillate so as to allow one of the shoes to penetrate, while the other may not enter the ground at all if the latter varies in condition in the line of the two furrows. By the connection herein shown the depth of penetration required is more easily obtained and regulated. Either the hand-lever A or the foot-rests $j$ can be used to force the runners into the ground, or they can be used together for the same purpose.

The arrangement of the hand and foot levers, as well as their several connections, is similar to those shown in my former patent before mentioned.

The gearing of my machine is differently constructed and arranged from that heretofore used for a like purpose. The main drive-wheel $C'$ (seen on the right of the machine) is rigidly attached to its spindle-shaft $t''$, which latter extends through the sleeve G (cast in a single piece with the bracket G') to the inside of the side bar, F''. On the inner end is the large bevel-wheel $b$, which forms the main drive-gear. The spindle-shaft $t''$ is secured in the wheel C' by a pin, $t'$, as seen in Figs. 3 and 6, so that the wheel can be taken off the spindle at any time necessary, for repairs or otherwise.

The gear for engaging with the wheel $b$ consists of three bevel-pinions, $a'$, $a''$, and $a'''$, each one consecutively larger than the other, to increase or decrease the speed of the drilling devices. They are fixed upon a tumbling-shaft, $b'$, extending from front to rear inside the right-side bar, and parallel therewith, which connects the seed-slide with the driving-gear. This shaft is pivoted at the rear end in a sleeve flexibly attached to the outer end of the spring-shaft $f''$, which is supported in the hangers $b^3$ and $b^4$ of the hanger-plate K, attached to the rear and under side of the axle E at the center.

Instead of the gear being thrown into engagement by the prong on the rear end of the tongue, the angular lever $e'$, which connects with the shaft $f'$, is operated by a vertical lever, $e''$, the upper end of which is pivotally attached to the under side of the foot-lever $f$, being suspended from a pin, $O'$, which extends transversely through an eye in its upper end.

About the middle of lever $e''$ is a cross-pin, V, projecting from either side of it, which rests in a groove, V', in the arms of a fork, W, on the end of the horizontal arm of $e'$. When the foot-lever is depressed, the pin V, resting on the fork, pushes down the horizontal arm, throws the vertical arm $q'$ outward, as seen in dotted lines, Fig. 6, drawing the shaft $f'$ endwise toward the left, thus disengaging the gear $a'$, $a''$, or $a'''$, as the case may be, from the drive-wheel $b$. In the view Fig. 3 the drilling devices are shown out of gear, and in the view Fig. 6 they are shown in engagement.

The angular lever $e'$ is pivoted between a pair of upright ears, $k'$, on the left end of the hanger-plate K, upon a pin, $q$, extending through them in rear of the axle E. The lower or vertical arm, $q'$, of lever $e'$ extends through a longitudinal slot in the end of $f'$, in which it is free to move, throwing $f'$ back and forth endwise as the horizontal arm is pressed down by pin V, or as it is elevated by the pressure of spring S' on the shaft $f'$. This device, being adapted to be used by the foot-lever alone, or the hand-lever in connection therewith, has many advantages over the device of a similar character shown in my former patent before referred to.

The loop $y'$ on plate K, through which the vertical lever $e''$ extends, operates not only as a guide, but prevents the lever from being laterally displaced. The extensible tumbling-shaft $b'$ is fitted with an internal ribbed sleeve, which slides over a grooved section and is held in adjustment by a set-screw.

To change the speed of the drilling devices, the three bevel-pinions $a'$, $a''$, and $a'''$ on the rear end of the shaft are used to engage the teeth in the large bevel-wheel $b$. These bevel-pinions increase in size and number of teeth from $a'$ to $a'''$, and they perform the same function as a concentric gear-wheel in changing the movement of the connected drilling devices, but in an easier manner and with less expense, as in a concentric gear-wheel, if any of the teeth are broken, the whole wheel must be thrown away, while in the case of breaking a tooth in one of the pinions the latter can be replaced at slight expense. There is also less danger of shock or breakage in bringing the pinion-gears into engagement with the drive-wheel, and the latter can be made of much less size than is required for a wheel having a series of concentric gears upon it.

In the seeding devices of my improved planter, as shown in Figs. 7, 10, 12, and 13, the seed-valve $e$ is in a single piece. It is flat and thin, and extends the full length of the seed-tube $c'$, as seen in the figures. It is provided with two opposite pivots, $j''$, on either edge, one of which is pivoted in the hole $j'$ of the seed-tube and the other in the runner-post $l$. A side view of the valve intact is shown in Fig. 13. The valve is made detachable, so as to be easily removed in converting the machine from a dropper to a drill.

To remove the valve $e$ it is only necessary to unscrew the nuts off bolts $k''$, as shown in Figs. 3 and 7, which extend through the lugs, seen on either side of the seed-tube $c'$, and raise the latter from out of the dovetail lugs $n'$, which extend out on each side of the runner-post $l$ at the bottom end.

By reference to Figs. 7, 10, 11, and 12 it will be seen that the pocket end $n$ of the seed-tube tapers from its top opening to the bottom, and that the lower end of the runner-post $l$, on the rear side, from the top of lugs $n'$, tapers in the same manner, so that the tapering pocket end of the tube $c'$ fits tightly between the lugs $n'$. These latter are undercut, as seen by the dotted lines, Fig. 7, forming a dovetail, and locking this end of the seed-tube tightly against the runner-post, between the lugs. The seed-tube is entirely open on the side next the runner-post, the rear surface of the latter forming one side of the seed-channel. No other fastening is required to attach it to the post than the lugs $n'$ at the lower end of the latter, while the upper end is bolted to the rear side of the cross-bar F, as before stated. As the entire valve $e$ is removed in changing the machine from a dropper to a drill, the seed-channel is wholly open and unobstructed, allowing the seed to reach the furrow in the least possible time and making the distance between the grains more accurate and regular than if any portion of the seed-valve remains within the tube.

The loose center pin, $m$, which pivots the seed-disk, is provided with means for retaining it in place, but at the same time is made readily removable. The means of retention consists in cutting or casting a transverse groove, $m^2$, diametrically across the top of the pin, and of inserting a split pin, $m'$, through upright lugs $o$, cast on the center plate, $r$, on either side of the pin-hole and through the groove $m^2$ of the pin. This secures the pin from being lost in handling or shipping the planter.

By reference to Figs. 2 and 3 an improvement in stirrups for the dropper's feet may be seen. This stirrup $p'$ is made of malleable iron and cast in single piece with lugs $s^2$, clamping the frame-bars upon either side, to which the stirrup is attached by a single bolt.

The driver's seat D has a longitudinal slot, $p''$, making it adjustable, and a bolt, $p$, extends through this slot, through the seat-bar B, and the brace $d$, (which latter is made in a single piece,) securing the whole together.

I claim as my invention—

1. The V-shaped plate secured to the brace-bars, and provided with a slotted or loop end at the angle of the same, for the insertion of a bar or rod, connecting it flexibly by a pin or its equivalent with the raising and lowering devices of a corn-planter, as and for the purpose set forth.

2. In a two-horse corn-planter having devices for elevating and depressing the front section, the combination, with said front section, of brace-bars extending from the point of the runners upon either side across and under the main cross-bar to a point forward of the axle, where they are united together, and provided with a loop or slotted plate for forming a connection with the raising and lowering devices, as and for the purpose set forth.

3. In a two-horse corn-planter convertible from a dropper to a drill, and adapted to be operated automatically, the combination, with the main drive-wheel, of a rigid spindle secured in the hub of said wheel, extending inward through and revoluble within a fixed sleeve fastened to the axle, and having a gear-wheel upon the inner end adapted to engage with a series of pinions upon a tumbling-shaft connecting said gear with the seeding devices, for the purpose of changing the motion of the seed-plates, as and for the purpose herein set forth.

4. In a two-horse corn-planter convertible from a dropper to a drill, and provided with means for operating automatically for either dropping or drilling, the combination, with an extensible and adjustable tumbling-shaft connecting the driving-gear with the seeding devices, of a series of pinions upon said shaft of respectively less diameter, and means for causing said pinions to engage and disengage with the drive-gear, as and for the purpose hereinbefore set forth.

5. In a corn-planter adapted to be operated automatically as a dropper and a drill, the combination, with a main gear-wheel having a single row of teeth thereon, of a longitudinally-extensible and radially-adjustable tumbling-shaft connecting said gear-wheel with the seeding devices, and provided with a series of pinions of gradually-increasing size and number of teeth, said pinions being brought into engagement with the teeth of the gear-wheel in changing the speed of the seeding devices, as and for the purpose set forth.

6. The combination, with foot-lever $f$, having the vertical lever $e''$ pivotally attached thereto, and provided with the projecting pin V, of the angular lever $e'$, pivoted by the pin $q$ to the hanger-plate K, its vertical arm $q'$ extending through a slot in the shaft $f'$, and adapted to operate it by depressing said foot-lever in disengaging pinions $a'$, $a''$, or $a'''$, as the case may be, from the drive-wheel $b$ through the movement of the shaft $f'$ and the intermediate auxiliary devices connected therewith.

7. The combination, with the hanger-plate K, provided with the ears $k'$, of the angular lever $e'$, pivoted therein by the pin $q$, and adapted to be operated by the foot-lever $f$, and the auxiliary connecting operative devices intermediate between the foot-lever and the spring-shaft $f'$ for throwing the mechanism out of gear with the seeding devices, substantially as set forth.

8. In a two-horse corn-planter adapted to be operated for both drilling and hilling, the combination, with the foot-lever, of a depending lever flexibly attached thereto, which engages with the operative devices for throwing the mechanism out of gear by depressing said foot-lever, as before set forth.

9. In a corn-planter convertible from a dropper to a drill, a seed-tube open throughout its entire length on the side next the runner-post, and made attachable to and detachable from said runner-post by a dovetail fastening at the lower ends of the tube and post, as shown.

10. A seed-tube for a corn-planter, having its lower or pocket end made wider at the back part than at the front, to secure it between the dovetail lugs on either side upon the foot of the runner-post.

11. The combination, with the runner-post $l$, provided with lugs $n'$, of the seed-tube $c'$, having the tapering dovetail pocket end $n$, as and for the purpose hereinbefore set forth.

12. In a corn-planter having a rotary seed-dropping device in which the seed-disk is detachable, a center pin for pivoting the said seed-disk, provided with a groove across the top of said pin to receive a key inserted through lugs in the cap-plate on either side of the same, and extending through said groove for the purpose of retaining the pin in its place and preventing it from displacement, as set forth.

13. The combination, with the cap-plate over the seed-disk, of lugs provided with holes on either side of the pin-hole for the insertion of the pin through the groove in the head of the pin between them, as herein set forth.

14. The combination, with a loose center pin and lugs on either side of the same, of the key extending through said lugs, over said pin, for the purpose of holding it in place, as set forth.

15. In combination with the loosely-fitting center pin, $m$, having a groove, $m^2$, across the top of the same, the lugs $o$ and the key $m'$, as and for the purpose set forth.

In testimony whereof I affix my signature in presence of two witnesses.

AUSTIN C. EVANS.

Witnesses:
H. B. RUDOLPH,
B. C. CONVERSE.